(12) United States Patent
Yoshihara

(10) Patent No.: US 8,730,441 B2
(45) Date of Patent: May 20, 2014

(54) ANTI-REFLECTION FILM

(75) Inventor: Toshiaki Yoshihara, Tokyo (JP)

(73) Assignee: Toppan Printing Co., Ltd. (JP)

( * ) Notice: Subject to any disclaimer, the term of this patent is extended or adjusted under 35 U.S.C. 154(b) by 55 days.

(21) Appl. No.: 13/523,651

(22) Filed: Jun. 14, 2012

(65) Prior Publication Data

US 2012/0249942 A1    Oct. 4, 2012

Related U.S. Application Data

(63) Continuation of application No. PCT/JP2009/071164, filed on Dec. 18, 2009.

(51) Int. Cl.
    *G02F 1/1335* (2006.01)

(52) U.S. Cl.
    USPC .............. 349/137; 349/96; 359/601; 359/580

(58) Field of Classification Search
    CPC .......................................................... G02B 1/10
    USPC ................... 349/137, 96; 359/601, 580, 493
    See application file for complete search history.

(56) References Cited

U.S. PATENT DOCUMENTS

| | | | | |
|---|---|---|---|---|
| 7,863,612 | B2 * | 1/2011 | Sato ................................. | 257/59 |
| 8,389,049 | B2 * | 3/2013 | Asahi et al. .................... | 427/164 |
| 2006/0172128 | A1 * | 8/2006 | Shinohara ...................... | 428/212 |
| 2006/0221451 | A1 * | 10/2006 | Ohishi et al. .................. | 359/599 |
| 2008/0218666 | A1 * | 9/2008 | Toyooka .......................... | 349/96 |
| 2010/0254003 | A1 * | 10/2010 | Higashikawa et al. ........ | 359/493 |
| 2010/0315715 | A1 * | 12/2010 | Oki et al. ....................... | 359/580 |
| 2011/0317263 | A1 * | 12/2011 | Yoneyama et al. ...... | 359/487.06 |
| 2013/0153009 | A1 * | 6/2013 | Kalkanoglu et al. .......... | 136/251 |

FOREIGN PATENT DOCUMENTS

| | | | |
|---|---|---|---|
| CN | 1841094 A | 10/2006 | |
| JP | 11-092750 | 4/1999 | |
| JP | 2004-004149 | 1/2004 | |
| JP | 2005-173216 | 6/2005 | |
| JP | 2005-199707 | * 7/2005 | ................ B32B 7/02 |
| JP | 2005-202389 | 7/2005 | |
| JP | 2005-297271 | 10/2005 | |
| JP | 2006-154758 | 6/2006 | |

(Continued)

OTHER PUBLICATIONS

Decision of Refusal for appl. No. 2008-254249, dispatched Mar. 19, 2013, 3 pgs.

(Continued)

*Primary Examiner* — Edward Glick
*Assistant Examiner* — Sang V Nguyen
(74) *Attorney, Agent, or Firm* — Squire Sanders (US) LLP

(57) ABSTRACT

The present invention provides an anti-reflection film which allows more appropriate black indication by reason of selectively restraining tinging with blue on the occasion of being provided for a transmission liquid crystal display surface to offer a black indication by changing the optical properties of the anti-reflection film. The anti-reflection film provided with visibility-average light transmittance absorption loss is within a range of 0.5% or more and 3.0% or less, a value obtained by subtracting a minimum value of light transmittance absorption loss at each wavelength in a visible light region from the maximum value thereof is within a range of 0.5% or more and 4.0% or less, and light transmittance absorption loss at each wavelength satisfies $Q_{450}>Q_{550}>Q_{650}$ ($Q_{450}$, $Q_{550}$ and $Q_{650}$: light transmittance absorption loss at a wavelength of 450 nm, 550 nm and 650 nm).

3 Claims, 3 Drawing Sheets

(56) References Cited

FOREIGN PATENT DOCUMENTS

| JP | 2006-309163 | 11/2006 |
|----|-------------|---------|
| JP | 2007-041534 | 2/2007 |
| JP | 2007-245622 | 9/2007 |
| JP | 2008/083673 | 4/2008 |
| JP | 2008-083673 | 4/2008 |
| JP | 2009-157233 | 7/2009 |
| WO | WO 2009/081752 | 7/2009 |

OTHER PUBLICATIONS

Translation of the Decision of Refusal for appl. No. 2008-254249, dispatched Mar. 19, 2013, 4 pgs.

Notification of Reasons for Refusal for appl. No. 2008-254249, mailed Dec. 4, 2012, 5 pgs.

International Preliminary Report on Patentability for appl. PCT/JP2009/071164, mailed Jul. 19, 2012, and translated Written Opinion of the International Searching Authority, 9 pgs.

Notice from JPO for appl. No. JP 2011-510602, mailed Oct. 24, 2013, 4 pgs.

Translation of the Notice from JPO for appl. No. JP 2011-510602, mailed Oct. 24, 2013, 10 pgs.

Notification from JPO for appl. No. JP 2011-510602, mailed Nov. 26, 2013, 4 pgs.

Translation of the Notification from JPO for appl. No. JP 2011-510602, mailed Nov. 26, 2013, 7 pgs.

Notice of Reasons of First Rejection from the State Intellectual Property Office of P.R.C. for appl. No. 200980163011.9, dated Nov. 13, 2013, 5 pgs.

Translation of the Notice of Reasons of First Rejection from the State Intellectual Property Office of P.R.C. for appl. No. 200980163011.9, dated Nov. 13, 2013, 11 pgs.

* cited by examiner ved for a transmission liquid crystal display surface.
ANTI-REFLECTION FILM This application is a continuation of International Application No. PCT/JP2009/071164, filed Dec. 18, 2009, which is incorporated herein by reference in its entirety.

BACKGROUND OF THE INVENTION

1. Field of the Invention

The present invention relates to an anti-reflection film, which is arranged for the purpose of preventing reflection of external light on the surface of a window, a display, and the like. Particularly, the present invention relates to an anti-reflection film, which is arranged on the surface of a liquid crystal display (LCD), and further on the surface of a transmission liquid crystal display (LCD).

2. Description of the Related Art

In general, displays are used in the environment onto which external light and the like are incident regardless of whether they are used indoors or outdoors. This incident light such as external light is reflected on the display surface so that a displayed image is interfered with the reflected image and the quality of display decreases. Hence, it is necessary to provide a display surface and the like with an anti-reflection function, and further, improvements of the anti-reflection function along with introductions of other extra useful functions are being demanded.

In general, an anti-reflection function is realized by forming an anti-reflection layer having a multilayer structure repeating high refractive index layers and low refractive index layers made of a transparent material such as metal oxide on a transparent substrate. The anti-reflection layer including this type of multilayer structure can be obtained by a dry coating method such as chemical vapor deposition (CVD) and physical vapor deposition (PVD). In the case where the anti-reflection layer is formed by a dry coating method, while there is an advantage of fine thickness controllability of a low refractive index layer and a high refractive index layer, there is also a problem of low productivity due to a limitation of a deposition process performed in a vacuum chamber, which is unsuitable for mass production. Thus, wet coating methods, which use a coating liquid for forming an anti-reflection layer and can provide a large display, produce continuously, and reduce costs, attract attention as a method of forming an anti-reflection layer.

In addition, in the anti-reflection film in which such anti-reflection layer is arranged on the transparent base, the surface thereof is relatively flexible. Thus, a method is generally used in which a hard coat layer resulting from curing of an acrylic-based material is arranged in order to give hardness to the surface, and an anti-reflection layer is formed on the hard coat layer. This hard coat layer is provided with a high level of surface hardness, transparency, and abrasion resistance due to the characteristics of the acrylic-based material.

<Patent document 1>: JP-A-2005-202389.
<Patent document 2>: JP-A-2005-199707.
<Patent document 3>: JP-A-H11-92750.
<Patent document 4>: JP-A-2004-4149.
<Patent document 5>: JP-A-2005-173216.
<Patent document 6>: JP-A-2005-297271.
<Patent document 7>: JP-A-2006-154758.

In the anti-reflection film provided with the hard coat layer and the low refractive index layer as the anti-reflection layer sequentially from the transparent substrate side, a polarizing plate is obtained by providing a polarizing layer and a second transparent substrate sequentially on an unforming surface of the low refractive index layer of the transparent substrate, and is provided for a transmission liquid crystal display surface. Here, in the transmission liquid crystal display provided with the polarizing plate using oriented polyvinyl alcohol, to which iodine is added, as the polarizing layer, there was a problem that blue light leakage occurred on the occasion of using the display as a black indication, which was tinged with blue.

SUMMARY OF THE INVENTION

Then, in the present invention, the problem to be solved is to render favorable the optical properties of the anti-reflection film, specifically, to provide the anti-reflection film such that in the transmission liquid crystal display provided with the polarizing plate using oriented polyvinyl alcohol, to which iodine is added, as the polarizing layer, the problem that a screen is tinged with blue when the anti-reflection film is arranged on the surface thereof to give the black indication is restrained by selecting a transmitted ray to allow more appropriate black indication. In addition, the problem to be solved is to provide the anti-reflection film which allows more appropriate black indication without deteriorating other indication grades in the case of being provided for the display surface.

The present invention dissolves the problem. A first aspect of the present invention is an anti-reflection film having a transparent substrate, a hard coat layer and a low refractive index layer, the hard coat layer and the low refractive index layer being on a surface of the transparent substrate, wherein visibility-average light transmittance absorption loss of the anti-reflection film is within a range of 0.5% or more and 3.0% or less, a value obtained by subtracting a minimum value of light transmittance absorption loss at each wavelength in a visible light region of the anti-reflection film from a maximum value of light transmittance absorption loss at each wavelength in a visible light region of the anti-reflection film is within a range of 0.5% or more and 4.0% or less, and light transmittance absorption loss at wavelengths of 450 nm, 550 nm, and 650 nm in the anti-reflection film satisfies $Q_{450} > Q_{550} > Q_{650}$ ($Q_{450}$: light transmittance absorption loss at a wavelength of 450 nm/$Q_{550}$: light transmittance absorption loss at a wavelength of 550 nm/$Q_{650}$: light transmittance absorption loss at a wavelength of 650 nm).

A second aspect of the present invention is the anti-reflection film according to the first aspect of the present invention, wherein visibility-average reflectance on the anti-reflection film surface on the low refractive index layer side is within a range of 0.5% or more and 1.5% or less.

A third aspect of the present invention is the anti-reflection film according to the second aspect of the present invention, wherein haze of the anti-reflection film is within a range of 0.5% or less and parallel ray transmittance of the anti-reflection film is within a range of 94.0% or more and 96.5% or less.

A fourth aspect of the present invention is the anti-reflection film according to the third aspect of the present invention, wherein a surface resistivity on the low refractive index layer surface of the anti-reflection film is within a range of $1.0 \times 10^6$ $\Omega/cm^2$ or more and $1.0 \times 10^{11}$ $\Omega/cm^2$ or less.

A fifth aspect of the present invention is the anti-reflection film according to the fourth aspect of the present invention, wherein a reflection hue in L*a*b* chromaticity system on the low refractive index layer surface of the anti-reflection film satisfies $0.00 \leq a^* \leq 3.00$ and $-3.00 \leq b^* \leq 3.00$.

A sixth aspect of the present invention is the anti-reflection film according to the fifth aspect of the present invention, wherein the hard coat layer contains zinc oxide-based particles.

A seventh aspect of the present invention is a polarizing plate including the anti-reflection film according to the sixth aspect of the present invention, a polarizing layer and a second transparent substrate sequentially on the low refractive index layer unforming surface of the anti-reflection film.

A eighth aspect of the present invention is a transmission liquid crystal display including the polarizing plate according to the seventh aspect of the present invention, a liquid crystal cell, a second polarizing plate and a backlight unit in this order.

The anti-reflection film having the above-mentioned constitution allowed more appropriate black indication for the reason that the problem that the screen was tinged with blue on the occasion of providing this anti-reflection film for the transmission liquid crystal display surface to give the display the black indication was restrained by selecting the transmitted ray. In addition, the anti-reflection film, which allowed more appropriate black indication without deteriorating other indication grades in the case of being arranged on the display surface, was provided.

DESCRIPTION OF NUMERALS

1 Anti-reflection film.
11 First transparent substrate.
12 Hard coat layer.
13 Low refractive index layer.
2 Polarizing plate.
22 Second transparent substrate.
23 Polarizing layer.
3 Liquid crystal cell.
4 Second polarizing plate.
41 Third transparent substrate.
42 Fourth transparent substrate.
43 Second polarizing layer.
5 Backlight unit.

EMBODIMENT OF THE INVENTION

Figure 1:
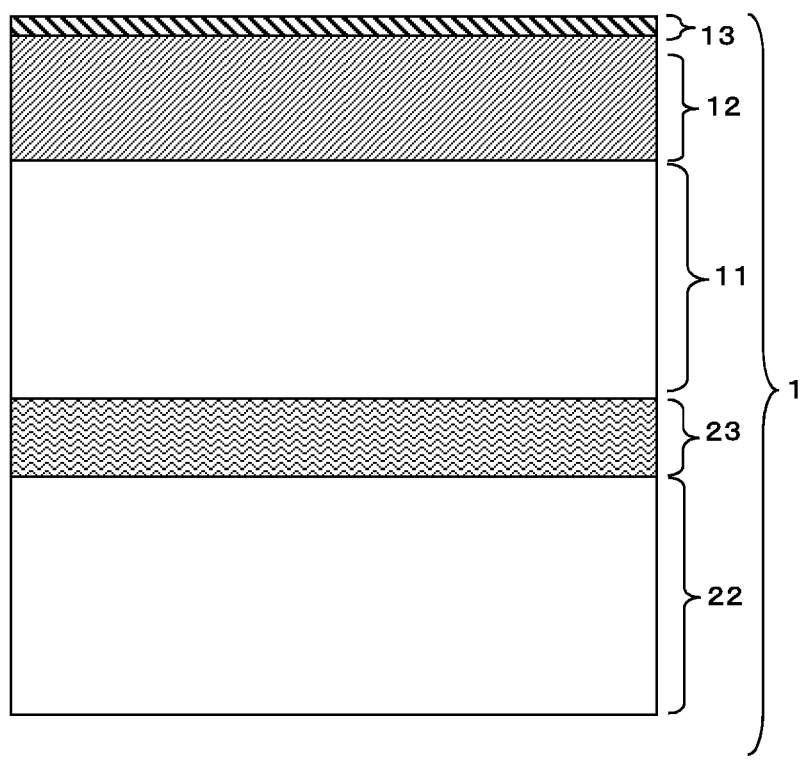
FIG. 1 is a cross-sectional schematic view of the anti-reflection film of the present invention.

A cross-sectional schematic view of the anti-reflection film of the present invention was shown in FIG. 1.

An anti-reflection film 1 of the present invention is sequentially provided with a hard coat layer 12 and a low refractive index layer 13 on at least one surface of a first transparent substrate 11. The hard coat layer 12 is provided on the first transparent substrate 11, so that high surface hardness may be imparted on the anti-reflection film surface to allow the anti-reflection film excellent in excoriation resistance. Further, the low refractive index layer 13 is provided on the hard coat layer 12. By means of providing the low refractive index layer with a layer thickness having an optical film thickness such as to become ¼ of a wavelength in a visible light region, external light which enters the anti-reflection film surface maybe restrained from reflecting and contrast in a bright place may be improved. Further, visible light transmittance of the anti-reflection film may be improved, so that white luminance on the occasion of offering the liquid crystal display using this as a white indication may be improved and the contrast may be improved.

The anti-reflection film of the present invention is characterized in that (1) visibility-average light transmittance absorption loss of the above-mentioned anti-reflection film is within a range of 0.5% or more and 3.0% or less, (2) a value obtained by subtracting the minimum value of light transmittance absorption loss at each wavelength in a visible light region of the anti-reflection film from the maximum value of light transmittance absorption loss at each wavelength in a visible light region of the above-mentioned anti-reflection film is within a range of 0.5% or more and 4.0% or less, and (3) light transmittance absorption loss at wavelengths of 450 nm, 550 nm, and 650 nm in the anti-reflection film is $Q_{450} > Q_{550} > Q_{650}$ ($Q_{450}$: light transmittance absorption loss at a wavelength of 450 nm/$Q_{550}$: light transmittance absorption loss at a wavelength of 550 nm/$Q_{650}$: light transmittance absorption loss at a wavelength of 650 nm). In the present invention, the anti-reflection film which satisfies all of the requirements (1) to (3) allows the anti-reflection film, which not only has the sufficient anti-reflection performance and the sufficient excoriation resistance performance but also allows more appropriate black indication for the reason that the problem that the screen was tinged with blue on the occasion of providing this anti-reflection film is arranged on the transmission liquid crystal display surface to give the display the black indication was restrained by selecting the transmitted ray.

The anti-reflection film of the present invention is characterized in that (1) visibility-average light transmittance absorption loss of the above-mentioned anti-reflection film is within a range of 0.5% or more and 3.0% or less.

Light transmittance absorption loss $Q\lambda$ at a wavelength $\lambda$ of the present invention is calculated by the following expression (Expression 1).

$$Q\lambda = 100 - H - T\lambda - R\lambda \qquad \text{(Expression 1)}$$

$Q\lambda$: light transmittance absorption loss (%)
H: haze (%)
$T\lambda$: spectral transmittance (%)
$R\lambda$: both-side reflectance (%)

Here, the both-side reflectance $R\lambda$ is the total of both surface reflectance Rs and rear surface reflectance Rb. The reflectance of the anti-reflection film is measured in a state that rear surface reflection is cancelled by applying black paint and the like to the rear surface, and then the rear surface is roughened with sandpaper and coated with black paint and the like, and only the surface reflectance Rs is measured by this method. Here, the both-side reflectance $R\lambda$ (=Rs+Rb) (at a wavelength $\lambda$) may be measured by measuring spectral reflectance without canceling this rear surface reflection (without roughening and applying the black paint). As clarified from (Expression 1), light transmittance absorption loss in the present invention is not loss due to scattering but loss due to light absorption.

Haze (H) of the anti-reflection film may be measured by JIS K 7105 (1981). The spectral transmittance $T\lambda$ and the both-side reflectance $R\lambda$ at a wavelength $\lambda$ of the anti-reflection film are measured in such a manner that C light source is used as a light source and incident and emergent angles of the light source and a photoreceptor are set at 5° from the vertical direction against the anti-reflection film surface to measure the spectral reflectance in the direct transmission direction and the regular reflection direction under the conditions of 2°-visual field. The visibility-average light transmittance absorption loss Q is a value obtained by correcting and averaging the light transmittance absorption loss Qλ at each wavelength of visible light with relative visibility. Then, bright-light vision standard relative visibility is used as the relative visibility.

In the anti-reflection film of the present invention, the visibility-average light transmittance absorption loss within a range of 0.5% or more and 3.0% or less allows the anti-reflection film which may provide the display excellent in contrast in a bright place and contrast in a dark place. In the case where the light transmittance absorption loss of the anti-reflection film is less than 0.5%, light leakage on the occasion of using the display as the black indication may not sufficiently be prevented, and luminance (black luminance) on the occasion of indicating a black image in a dark place becomes so high as to deteriorate the contrast in a dark place. On the other hand, in the case where the light transmittance absorption loss of the anti-reflection film is more than 3.0%, black luminance of the display may be lowered in a dark place, but luminance (white luminance) on the occasion of indicating a white image becomes so low as to occasionally deteriorate the contrast in a dark place eventually.

The anti-reflection film of the present invention is characterized in that (2) a value obtained by subtracting the minimum value of light transmittance absorption loss at each wavelength in a visible light region of the anti-reflection film from the maximum value of light transmittance absorption loss at each wavelength in a visible light region of the above-mentioned anti-reflection film is within a range of 0.5% or more and 4.00 or less. The value obtained by subtracting the minimum value of the light transmittance absorption loss at each wavelength from the maximum value thereof is determined within a range of 0.5% or more and 4.00 or less, so that the light transmittance absorption loss of the anti-reflection film exhibits a gentle wavelength dependence over the visible light region to allow the anti-reflection film with favorable color reproducibility on the occasion of providing this anti-reflection film on the display surface. In the case where the value obtained by subtracting the minimum value of the light transmittance absorption loss at each wavelength in the visible light region from the maximum value thereof is more than 4.0%, the anti-reflection film is provided with such a specific large light absorption wavelength over the visible light region that the image is tinted on the occasion of offering the screen as the white indication in the display using this. On the other hand, in the case where the value obtained by subtracting the minimum value of the light transmittance absorption loss at each wavelength in the visible light region from the maximum value thereof is less than 0.5%, the problem that the screen was tinged with blue on the occasion of offering the screen as the black indication may not be restrained even though this anti-reflection film is provided on the transmission liquid crystal display surface. The visible light region intended for the maximum value and the minimum value of the light transmittance absorption loss of the present invention is within a range of 400 nm or more and 700 nm or less.

The anti-reflection film of the present invention is characterized in that (3) light transmittance absorption loss at wavelengths of 450 nm, 550 nm, and 650 nm in the anti-reflection film is $Q_{450}>Q_{550}>Q_{650}$ ($Q_{450}$: light transmittance absorption loss at a wavelength of 450 nm/$Q_{550}$: light transmittance absorption loss at a wavelength of 550 nm/$Q_{650}$: light transmittance absorption loss at a wavelength of 650 nm). (2) The value obtained by subtracting the minimum value of the light transmittance absorption loss at each wavelength in the visible light region from the maximum value thereof is determined within a range of 0.5% or more and 4.0% or less, and (3) the light transmittance absorption loss at wavelengths of 450 nm, 550 nm, and 650 nm in the anti-reflection film satisfies $Q_{450}>Q_{550}>Q_{650}$, so that the anti-reflection film of the present invention maybe provided with a gentle light absorption on the short wavelength side.

Then, the anti-reflection film of the present invention is provided with a gentle light absorption on the short wavelength side, so that the problem that the screen was tinged with blue on the occasion of offering as the black indication, the transmission liquid crystal display having as a component the polarizing plate using oriented polyvinyl alcohol, to which iodine is added, as the polarizing layer is solved while selectively restrained by providing this anti-reflection film on the observer side to allow the transmission liquid crystal display which may give more appropriate black indication. That is to say, with regard to a pair of the polarizing plates (using iodine oriented polyvinyl alcohol), blue light leakage caused on the occasion of orthogonalizing polarization directions thereof may be selectively absorbed in the anti-reflection film of the present invention, so that the problem that the screen was tinged with blue on the occasion of offering the display as the black indication may be selectively restrained by providing this anti-reflection film on the liquid crystal display surface.

Further, in the anti-reflection film of the present invention, visibility-average reflectance on the anti-reflection film surface is preferably within a range of 0.5% or more and 1.5% or less. In the case where the visibility-average reflectance is more than 1.5%, a reflection of external light which enters the anti-reflection film surface may not sufficiently be prevented, and the anti-reflection film having such a sufficient anti-reflection function as to be provided on the display surface may not be obtained. On the other hand, in the case where the visibility-average reflectance is less than 0.5%, a difference between the maximum value and the minimum value of the spectral reflectance in a range of 400 nm to 700 nm as wavelengths in the visible light region becomes so large that it occasionally becomes difficult to make a reflection hue into a neutral and tintless state and the anti-reflection film becomes so inappropriate to be provided as the display surface.

The visibility-average reflectance on the low refractive index layer side of the anti-reflection film surface of the present invention is obtained from a spectral reflectance curve. The spectral reflectance curve is obtained in such a manner that C light source is used as a light source and incident and emergent angles of the light source and a photoreceptor are set at 5° from the vertical direction against the anti-reflection film surface to measure the spectral reflectance in the regular reflection direction under the conditions of 2°-visual field. The spectral reflectance is measured by irradiating with measuring light on the low refractive index layer in a state that rear surface reflection is cancelled by roughening with sandpaper an opposite surface to the low refractive index layer forming surface of the anti-reflection film, which is coated with black paint. The visibility-average reflectance is a value of the reflectance obtained by correcting and averaging the reflectance at each wavelength in the visible light region with relative visibility. Then, bright-light vision standard relative visibility is used as the relative visibility.

Further, in the anti-reflection film of the present invention, it is preferable that the haze (H) of the anti-reflection film is within a range of 0.5% or less and parallel ray transmittance of the above-mentioned anti-reflection film is within a range of 94.0% or more and 96.5% or less.

The anti-reflection film with high contrast in a bright place is allowed by determining the haze of the anti-reflection film of the present invention at 0.5% or less. In the case where the haze is more than 0.5%, light leakage on the occasion of using the liquid crystal display as the black indication in a dark place may be apparently restrained by the reason of transmission loss due to scattering; however, on the occasion of the black indication in a bright place, the scattering makes the black indication into white blur to deteriorate the contrast. The haze of the anti-reflection film may be measured by JIS K 7105 (1981).

The contrast of the liquid crystal display using this anti-reflection film may be made favorable by determining the parallel ray transmittance of the anti-reflection film at 94.0% or more and 96.5% or less. In the case where the parallel ray transmittance of the anti-reflection film is less than 94.0%, white luminance on the occasion of using the display as the white indication becomes so low as to deteriorate the contrast. In addition, an improvement in the parallel ray transmittance by providing the low refractive index layer is cancelled. On the other hand, in consideration of the rear surface reflection, it is substantially difficult to produce the anti-reflection film having a parallel ray transmittance of more than 96.5%, and the anti-reflection film of the present invention is characterized in that the parallel ray transmittance is 96.5% or less. The parallel ray transmittance of the anti-reflection film may be measured by JIS K 7105 (1981).

Further, a surface resistivity on the surface of the low refractive index layer provided in the anti-reflection film of the present invention is preferably within a range of $1.0 \times 10^6$ $\Omega/cm^2$ or more and $1.0 \times 10^{11}$ $\Omega/cm^2$ or less. The surface resistivity on the low refractive index layer surface of the anti-reflection film of the present invention is set within the above-mentioned range, thereby an antistatic function may be provided in the anti-reflection film and adhesive dirt such as dust may be prevented from occurring on the occasion of providing the anti-reflection film on the display surface. Further, electrification on the display surface may be prevented from influencing the inside of the display. In the case where the surface resistivity on the low refractive index layer surface is more than $1.0 \times 10^{11}$ ($\Omega/cm^2$), the anti-reflection film having sufficient antistatic properties may not be obtained. On the other hand, in the case where the surface resistivity on the low refractive index layer surface is less than $1.0 \times 10^6$ ($\Omega/cm^2$), conductive particles need to be added into a binder matrix in large quantities for obtaining this state, and this addition is uneconomical; also, optical properties do not satisfy the properties as the anti-reflection film used for the display and occasionally become nonadjustable in the present invention.

It may be realized by adding a conductive material to the hard coat layer that the antistatic function is provided for the anti-reflection film to determine the surface resistivity within the above-mentioned range.

Further, with regard to the anti-reflection film of the present invention, the reflection hue in L*a*b* chromaticity system on the anti-reflection film surface on the side on which the above-mentioned low refractive index layer is formed, namely, the low refractive index layer surface is preferably $0.00 \leq a^* \leq 3.00$ and $-3.00 \leq b^* \leq 3.00$. The reflection hue in L*a*b* chromaticity system on the anti-reflection film surface on the low refractive index layer side is set within the above-mentioned range, thereby the tintless anti-reflection film may be obtained and the display surface is used more appropriately.

The reflection hue is more colorless as a* and b* are closer to 0. However, $-3.00 \leq a^* \leq 0.00$ is a green region with high relative visibility and observers tend to recognize a tint easily. Accordingly, in the anti-reflection film of the present invention, $0.00 \leq a^* \leq 3.00$ and $-3.00 \leq b^* 3.00$ are preferably determined.

The reflection hue of the anti-reflection film of the present invention is measured by a spectrophotometer after applying lusterless black paint on the transparent substrate surface on the side on which the hard coat layer and the low refractive index layer are not provided. The reflection hue is obtained in such a manner that C light source is used as a light source and incident and emergent angles of the light source and a photoreceptor are determined at 5° from the vertical direction against the anti-reflection film surface to measure the spectral reflectance in the regular reflection direction under the conditions of 2°-visual field.

Further, with regard to the anti-reflection film of the present invention, the hard coat layer preferably contains zinc oxide-based particles. The zinc oxide-based conductive particles such as zinc oxide, aluminum-doped zinc oxide (AZO) and gallium-doped zinc oxide (GZO) exhibit a tendency such that the light transmittance absorption loss at each wavelength in the visible light region decreases as the wavelength lengthens. Accordingly, the use of the zinc oxide-based conductive particles allows the anti-reflection film to be easily produced, such that the light transmittance absorption loss at wavelengths of 450 nm, 550 nm, and 650 nm satisfies $Q_{450} > Q_{550} > Q_{650}$. Further, the zinc oxide-based conductive particles such as zinc oxide, aluminum-doped zinc oxide (AZO) and gallium-doped zinc oxide (GZO) are preferable for the reason that the antistatic function may be provided for the anti-reflection film.

Figure 2:
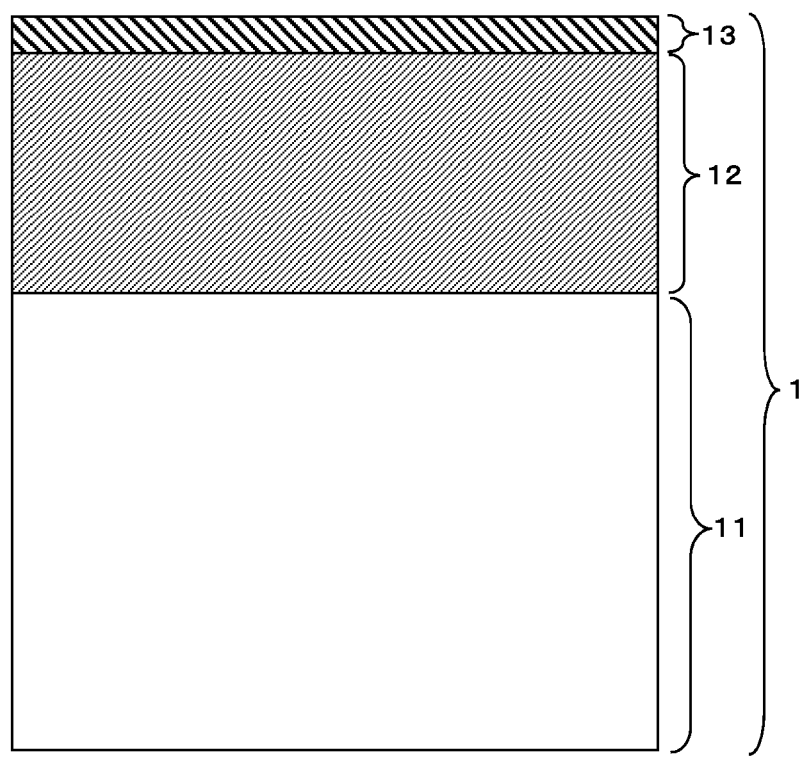
FIG. 2 is a cross-sectional schematic view of the polarizing plate of the present invention, which uses the anti-reflection film of the present invention.

Next, a polarizing plate using the anti-reflection film of the present invention is described. A cross-sectional schematic view of the polarizing plate using the anti-reflection film of the present invention was shown in FIG. 2. The polarizing plate 2 according to the present invention has a structure such that a polarizing layer is held between two transparent substrates. The anti-reflection film of the present invention is provided with the hard coat layer and the low refractive index layer in this order on one surface of the transparent substrate. The polarizing plate 2 of the present invention is sequentially provided with a polarizing layer 23 and a second transparent substrate 22 on the other surface of a first transparent substrate 11 composing the anti-reflection film 1. That is to say, the first transparent substrate 11 composing the anti-reflection film 1 has a structure such as to serve as a transparent substrate for holding the polarizing layer 23 therebetween.

Figure 3:
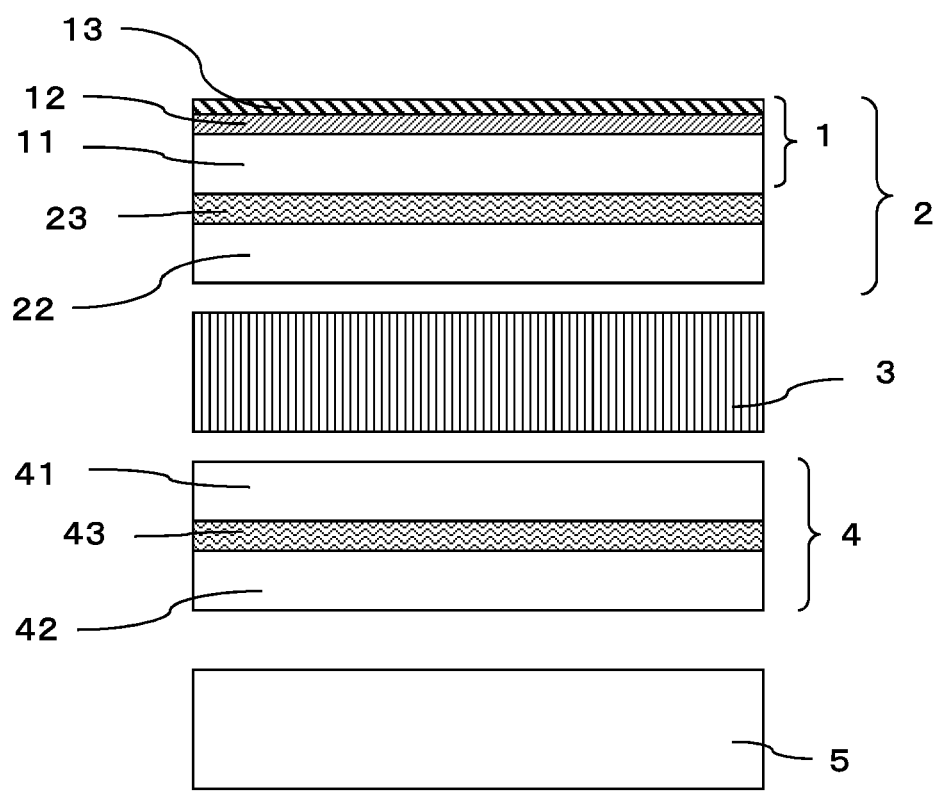
FIG. 3 is a cross-sectional schematic view of the transmission liquid crystal display of the present invention, which is provided with the anti-reflection film of the present invention.

Next, a transmission liquid crystal display using the anti-reflection film of the present invention is described. A cross-sectional schematic view of the transmission liquid crystal display provided with the anti-reflection film of the present invention was shown in FIG. 3. The transmission liquid crystal display according to the present invention shown in FIG. 3 is provided with a backlight unit 5, a second polarizing plate 4, a liquid crystal cell 3, and the first polarizing plate 2 including the anti-reflection film 1 as the polarizing plate of the present invention in this order. Then, the anti-reflection film side is the observation side, that is, the display surface.

The backlight unit is provided with a light source and a light diffuser panel (not shown in FIGS.). The liquid crystal cell has a structure that an electrode is provided in one transparent substrate, an electrode and a color filter are provided in the other transparent substrate, and the liquid crystal is sealed between both of the electrodes (not shown in FIGS.). The second polarizing plate 4 has a structure that the second polarizing layer 43 is held between a third transparent substrate 41 and a fourth transparent substrate 42. The first polarizing plate 2 and the second polarizing plate 4 are provided so as to hold the liquid crystal cell 3 therebetween.

Further, the transmission liquid crystal display of the present invention may be provided with other functional members. Examples of the other functional members include a diffusion film, a prism sheet and a luminance enhancement film to use effectively the light emitted from the backlight, and a retardation film for compensating retardation of the liquid crystal cell and the polarizing plate; however, the transmission liquid crystal display of the present invention is not limited thereto.

Next, a method for producing the anti-reflection film of the present invention is described.

A film or a sheet made of various organic polymers may be used as a transparent substrate in the anti-reflection film of the present invention. Examples thereof include a substrate ordinarily used for an optical member such as display, and organic polymers, for example, polyolefins such as polyethylene and polypropylene, polyesters such as polyethylene terephthalate and polyethylene naphthalate, celluloses such as triacetyl cellulose, diacetyl cellulose and cellophane, polyamides such as 6-nylon and 6,6-nylon, acryls such as polymethyl methacrylate, polystyrene, polyvinyl chloride, polyimide, polyvinyl alcohol, polycarbonate, and ethylene vinylalcohol, in consideration of optical properties such as transparency and refractive index of light, and physical properties such as shock resistance, heat resistance and durability. In particular, polyethylene terephthalate, triacetyl cellulose, polycarbonate and polymethyl methacrylate are preferable. Above all, triacetyl cellulose may be appropriately used for the liquid crystal display by the reason of being small in birefringence and favorable in transparency.

The thickness of the transparent substrate is preferably within a range of 25 μm or more and 200 μm or less, more preferably within a range of 40 μm or more and 80 μm or less.

In addition, these organic polymers to which the function is allowed by adding publicly known addition agents such as an ultraviolet absorbing agent, an infrared absorbing agent, a plasticizer, a lubricant, a coloring agent, an antioxidant and a fire retardant may be also used. Further, the transparent substrate may be a mixture, a polymer or a laminate of plural layers of one kind or two kinds or more selected from the above-mentioned organic polymers.

Next, a method for forming the hard coat layer is described. The hard coat layer may be obtained in such a manner that a coating liquid for forming a hard coat layer containing an ionizing radiation-curable material is applied onto the transparent substrate, on which a coating film is formed and dried as required to thereafter perform a curing reaction of the an ionizing radiation-curable material by irradiating with an ionizing radiation such as ultraviolet rays and electron rays.

Examples of an application method for the coating liquid for forming the hard coat layer include an application method by using a roll coater, a reverse-roll coater, a gravure coater, a microgravure coater, a knife coater, a bar coater, a wire bar coater, a die coater and a dip coater.

An acrylic material may be used as the ionizing radiation-curable material added to the coating liquid for forming the hard coat layer. Examples of the acrylic material include a mono-functional or poly-functional(meth)acrylate compound such as acrylate or methacrylate of polyhydric alcohol, and a poly-functional urethane(meth)acrylate compound such as the ones to be synthesized from diisocyanate, polyhydric alcohol and hydroxyester of acrylic acid or methacrylic acid. In addition to these, examples of the ionizing radiation-curable material include polyether resin, polyester resin, epoxy resin, alkyd resin, spiroacetal resin, polybutadiene resin and polythiol polyene resin having an acrylate-based functional group.

In the present invention, '(meth)acrylate' represents both of 'acrylate' and 'methacrylate'. For example, 'urethane (meth)acrylate' represents both of 'urethane acrylate' and 'urethane methacrylate'.

Examples of the mono-functional(meth)acrylate compound include 2-hydroxyethyl(meth)acrylate, 2-hydroxypropyl(meth)acrylate, 2-hydroxybutyl(meth)acrylate, n-butyl(meth) acrylate, isobutyl(meth) acrylate, tert-butyl(meth) acrylate, glycidyl(meth)acrylate, acryloyl morpholine, N-vinyl pyrrolidone, tetrahydrofurfuryl acrylate, cyclohexyl (meth)acrylate, 2-ethylhexyl(meth)acrylate, isobornyl(meth) acrylate, isodecyl(meth)acrylate, lauryl(meth)acrylate, tridecyl(meth)acrylate, cetyl(meth)acrylate, stearyl(meth)acrylate, benzyl(meth)acrylate, 2-ethoxyethyl(meth)acrylate, 3-methoxybutyl(meth)acrylate, ethyl carbitol (meth)acrylate, phosphoric acid(meth)acrylate, ethylene oxide modified phosphoric acid(meth)acrylate, phenoxy (meth)acrylate, ethylene oxide modified phenoxy(meth)acrylate, propylene oxide modified phenoxy(meth)acrylate, nonyl phenol(meth)acrylate, ethylene oxide modified nonyl phenol (meth)acrylate, propylene oxide modified nonyl phenol (meth)acrylate, methoxy diethylene glycol(meth)acrylate, methoxy polyethylene glycol(meth)acrylate, methoxy propylene glycol(meth)acrylate, 2-(meth)acryloyloxyethyl-2-hydroxypropyl phthalate, 2-hydroxy-3-phenoxypropyl(meth) acrylate, 2-(meth)acryloyloxyethyl hydrogen phthalate, 2-(meth)acryloyloxypropyl hydrogen phthalate, 2-(meth) acryloyloxypropyl hexahydro hydrogen phthalate, 2-(meth) acryloyloxypropyl tetrahydro hydrogen phthalate, dimethylaminoethyl(meth)acrylate, trifluoroethyl(meth)acrylate, tetrafluoropropyl(meth)acrylate, hexafluoropropyl(meth) acrylate, octafluoropropyl(meth)acrylate, octafluoropropyl (meth)acrylate, and adamantane derivative mono(meth)acrylate such as adamanthyl acrylate having monovalent mono (meth)acrylate derived from 2-adamantane or adamantane diol.

Examples of the above-mentioned di-functional(meth) acrylate compound include di(meth)acrylates such as ethylene glycol di(meth)acrylate, diethylene glycol di(meth)acrylate, butanediol di(meth)acrylate, hexanediol di(meth) acrylate, nonanediol di(meth)acrylate, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylate, and hydroxypivalic acid neopentyl glycol di(meth)acrylate.

Examples of the above-mentioned tri- or higher-functional (meth)acrylate compound include tri-functional(meth)acrylate compounds such as tri(meth)acrylates such as trimethylolpropane tri(meth)acrylate, ethoxylated trimethylolpropane tri(meth)acrylate, propoxylated trimethylolpropane tri(meth)acrylate, tris 2-hydroxyethyl isocyanurate tri(meth)acrylate and glycerin tri(meth)acrylate, pentaerythritol tri(meth)acrylate, dipentaerythritol tri(meth) acrylate, and ditrimethylolpropane tri(meth)acrylate; poly-functional or higher-functional(meth)acrylate compounds such as pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth) acrylate, and ditrimethylolpropane hexa(meth)acrylate; and poly-functional(meth)acrylate compounds such that part of these (meth)acrylates is substituted with an alkyl group or ε-caprolactone; and the like.

Among the acrylic materials, the poly-functional urethane acrylate may be appropriately used for the reason that desired molecular weight and molecular structure may be designed and the physical properties of the hard coat layer to be formed may be easily balanced. The urethane acrylate is obtained by reacting polyhydric alcohol, polyhydric isocyanate and hydroxyl group-containing acrylate. Specific examples thereof include UA-306H, UA-306T and UA-3061 manufactured by Kyoei Kagaku Kogyo Co., Ltd., UV-1700B, UV-6300B, UV-7600B, UV-7605B, UV-7640B and UV-7650B manufactured by The Nippon Synthetic Chemical Industry Co., Ltd., U-4HA, U-6HA, UA-100H, U-6LPA, U-15HA, UA-32P and U-324A manufactured by Shin Nakamura Chemical Co., Ltd., Ebecryl-1290, Ebecryl-1290K and Ebecryl-5129 manufactured by DAICEL-UCB Company LTD., and UN-3220HA, UN-3220HB, UN-3220HC and UN-3220HS manufactured by Negami Chemical Industrial Co., Ltd., and are not limited thereto.

In addition to these, examples of the ionizing radiation-curable material include polyether resin, polyester resin, epoxy resin, alkyd resin, spiroacetal resin, polybutadiene resin and polythiol polyene resin having an acrylate-based functional group.

Further, in the case where the coating liquid for forming the hard coat layer is cured by ultraviolet rays, a photopolymerization initiator is added to the coating liquid for forming the hard coat layer. The photopolymerization initiator maybe such as to generate a radical while irradiated with ultraviolet rays, and examples thereof include acetophenones, benzoins, benzophenones, phosphine oxides, ketals, anthraquinones and thioxanthones. Further, the added amount of the photopolymerization initiator is 0.1 part by weight or more and 10 parts by weight or less, preferably 1 part by weight or more and 7 parts by weight or less with respect to 100 parts by weight of the ionizing radiation-curable material.

Further, a light-absorbing material is added to the coating liquid for forming the hard coat layer so that the visibility-average light transmittance absorption loss of the anti-reflection film is within a range of 0.5% or more and 3.0% or less, the value obtained by subtracting the minimum value of the light transmittance absorption loss at each wavelength in the visible light region of the anti-reflection film from the maximum value thereof is 4.0% or less, and the light transmittance absorption loss at wavelengths of 450 nm, 550 nm, and 650 nm in the anti-reflection film satisfies $Q_{450} > Q_{550} > Q_{650}$.

Zinc oxide-based particles may be appropriately used as the light-absorbing material. The zinc oxide-based conductive particles such as zinc oxide, aluminum-doped zinc oxide (AZO) and gallium-doped zinc oxide (GZO) exhibit a tendency such that the light transmittance absorption loss at each wavelength in the visible light region decreases as the wavelength lengthens. Accordingly, the use of the zinc oxide-based conductive inorganic particles allows the anti-reflection film to be easily produced, such that the light transmittance absorption loss at wavelengths of 450 nm, 550 nm, and 650 nm satisfies $Q_{450} > Q_{550} > Q_{650}$. Further, the zinc oxide-based conductive inorganic particles such as zinc oxide, aluminum-doped zinc oxide (AZO) and gallium-doped zinc oxide (GZO) are preferable for the reason that the antistatic function maybe provided for the anti-reflection film.

Further, titanium oxide-based particles may be used as the light-absorbing material. The titanium oxide-based particles also exhibit a tendency such that the light transmittance absorption loss at each wavelength in the visible light region decreases as the wavelength lengthens. However, the sufficient antistatic function is provided for the anti-reflection film with difficulty by only the titanium oxide-based particles.

The light-absorbing material added to the coating liquid for forming the hard coat layer of the present invention is preferably particles with a particle diameter of 1 nm or more and 100 nm or less. In the case where the particle diameter is more than 100 nm, light is reflected so remarkably by Rayleigh scattering that the hard coat layer whitens to bring a tendency to deteriorate the visible light transmittance of the anti-reflection film. Further, in the case where the particle diameter is more than 100 nm, the haze of the anti-reflection film rises to determine the haze at 0.5% or less with difficulty. On the other hand, in the case where the particle diameter is less than 1 nm, the conductivity deteriorates, the surface resistivity of the anti-reflection film becomes large and the light-absorbing particles cohere to occasionally cause a problem that the dispersion of the light-absorbing particles and the conductive particles in the hard coat layer becomes nonuniform. These light-absorbing particles may be used each singly or in combination of plural kinds different in material and size.

Further, a conductive polymer and conductive particles may be added to the coating liquid for forming the hard coat layer for the purpose of providing the antistatic function for the anti-reflection film to be obtained. A conductive material needs to be added for providing the antistatic function for the hard coat layer, and then the conductive material is roughly divided into a conductive material of an electron conduction type and a conductive material of an ion conduction type. Here, the conductive material of an electron conduction type is preferable by the reason of being capable of stably performing the antistatic function even under low humidity.

Examples of the conductive polymer of an electron conduction type include polyacethylene, polyaniline, polythiophene, polypyrrole, polyphenylene sulfide, poly(1,6-heptadiyne), polybiphenylene(polyparaphenylene), polyparaphenylene sulfide, polyphenylacethylene, poly(2,5-phenylene), and a mixture of one kind or two kinds or more selected from derivatives thereof.

These conductive polymers are appropriate for the reason that conductivity may be developed in a comparatively small added amount and any of the polymers has absorption in the whole visible light region and does not have a specific absorption peak, and the added amount may be properly adjusted so that desired surface resistivity and visibility-average light transmittance absorption loss as the hard coat layer are 0.5% or more and 3.0% or less.

Appropriate examples of the conductive inorganic particles of an electron conduction type include the conductive particles of an electron conduction type such as indium oxide, indium oxide-tin oxide (ITO), tin oxide, antimony-doped tin oxide (ATO), phosphorus-doped tin oxide (PTO), fluorine-doped tin oxide (FTO), zinc oxide, aluminum-doped zinc oxide (AZO) and gallium-doped zinc oxide (GZO).

The film thickness of the hard coat layer and the content of the conductive particles in the hard coat layer may be properly selected in accordance with desired conductivity and refractive index; in order to determine the visibility-average light transmittance absorption loss within a range of 0.5% or more and 3.0% or less, it is desirable that the content rate of the conductive inorganic particles in the hard coat layer is less than 5 wt % and a content within a range of 0.1 $g/m^2$ or more and 0.8 $g/m^2$ or less per unit area. In the case where the content of the conductive inorganic particles per unit area is less than 0.1 $g/m^2$, the effect of light absorption may not be expected to exhibit a tendency such that conductivity becomes insufficient; meanwhile, in the case where the content of the conductive inorganic particles per unit area is more than 0.8 g/m², the transmittance deteriorates greatly due to light absorption by the conductive inorganic particles to exhibit a tendency such that the contrast and color reproducibility of the display using this anti-reflection film deteriorate greatly. In order to satisfy all of the light absorption function, the antistatic function and the hard coat function, an achievement thereof is difficult unless the added amount of the conductive inorganic particles is less than 5 wt %. In the case of the added amount of less than 5 wt %, conductivity frequently becomes insufficient by only the conductive inorganic particles; conductivity may be achieved by maldistributing or aggregating the particles with the use together with the conductive polymer (compositeness) and in utilization of a difference in the physical properties of the conductive inorganic particles in the film-forming process of the hard coat layer (specific gravity, surface tension, compatibility and ionicity).

The conductive particles used for the hard coat layer of the present invention are preferably 1 nm or more and 100 nm or less in particle diameter. In the case where the particle diameter is more than 100 nm, light is reflected so remarkably by Rayleigh scattering that the hard coat layer whitens to bring a tendency to deteriorate the visible light transmittance of the anti-reflection film. Further, in the case where the particle diameter is more than 100 nm, the haze of the anti-reflection film rises to determine the haze at 0.5% or less with difficulty. On the other hand, in the case where the particle diameter is less than 1 nm, the conductivity of the hard coat layer deteriorates, the surface resistivity of the anti-reflection film becomes large and the conductive particles cohere to bring a possibility of causing a problem that the dispersion of the conductive particles in the hard coat layer becomes nonuniform. These conductive particles (antistatic agents) maybe used each singly or in combination of plural kinds different in material and size.

It is favorable that the hard coat layer of the present invention does not contain particles having an average particle diameter of more than 100 nm in order to obtain an image with a haze of 0.5% or less and a high contrast in a bright place.

In addition, a solvent and various addition agents may be added to the coating liquid for forming the hard coat layer as required. The solvent is properly selected in consideration of coating aptitude from among aromatic hydrocarbons such as toluene, xylene, cyclohexane and cyclohexylbenzene, hydrocarbons such as n-hexane, ethers such as dibutyl ether, dimethoxymethane, dimethoxyethane, diethoxyethane, propylene oxide, dioxane, dioxolane, trioxane, tetrahydrofuran, anisole and phenetole, ketones such as methyl isobutyl ketone, methyl butyl ketone, acetone, methyl ethyl ketone, diethyl ketone, dipropyl ketone, diisobutyl ketone, cyclopentanone, cyclohexanone, methylcyclohexanone and methylcyclohexanone, esters such as ethyl formate, propyl formate, n-pentyl formate, methyl acetate, ethyl acetate, methyl propionate, ethyl propionate, n-pentyl acetate and γ-butyrolactone, cellosolves such as methyl cellosolve, cellosolve, butyl cellosolve and cellosolve acetate, and the like. Further, a surface adjustor, a refractive index adjustor, an adhesion improver and a curing agent as the addition agents may be added to the coating liquid.

Above all, the solvent of the coating liquid for forming the hard coat layer preferably contains a solvent such as to dissolve or swell the transparent substrate. The coating liquid for forming the hard coat layer contains a solvent such as to dissolve or swell the transparent substrate, so that the adhesion properties between the hard coat layer to be formed and the transparent substrate may be improved.

Further, other particles with an average particle diameter of 100 nm or less in addition to the light-absorbing particles and the conductive particles may be added to the coating liquid for forming the hard coat layer for the purpose of improving the surface hardness of the hard coat layer to be formed. For example, alumina ($Al_2O_3$) particles and silica ($SiO_2$) nano particles with an average particle diameter of 30 nm may be contained as such other particles by approximately 20 to 30 wt %. In the case where particles with an average particle diameter of more than 100 nm as the other particles are added to the coating liquid for forming the hard coat layer to form the hard coat layer, light is reflected so remarkably by Rayleigh scattering that the hard coat layer whitens to bring a tendency to deteriorate the transparency of the anti-reflection film. Further, the haze tends to rise.

Further, other addition agents maybe added to the coating liquid for forming the hard coat layer. Examples of the addition agents include an antifrothing agent, a leveling agent, an antioxidant, an ultraviolet absorbing agent, a light stabilizer and a polymerization inhibitor, and are not limited thereto.

Further, thermoplastic resin may be added to the coating liquid for forming the hard coat layer for the purpose of preventing the anti-reflection film from curling after forming the hard coat layer. The hard coat layer is formed through the above.

The layer thickness of the hard coat layer to be formed is preferably within a range of 3 µm or more and 15 µm or less. In the case where the layer thickness of the hard coat layer is less than 3 µm, the hardness of the anti-reflection film becomes so insufficient as to deteriorate excoriation resistance. On the other hand, in the case where the layer thickness of the hard coat layer is more than 15 µm, curling becomes so large due to shrinkage on curing of the hard coat layer as to cause a problem such that a hindrance is brought on the occasion of making the anti-reflection film into the polarizing plate and a crack occurs in the hard coat layer.

Surface treatments such as an acid treatment, an alkali treatment, a corona treatment method and an atmospheric glow discharge plasma method may be performed for the hard coat layer before forming the low refractive index layer on the hard coat layer. The performance of these surface treatments allows the adhesion properties between the hard coat layer and the low refractive index layer to be further improved.

In the case where a metal alkoxide such as silicon alkoxide is used as a binder matrix forming material for forming the low refractive index layer, the alkali treatment is preferably performed before forming the low refractive index layer. The performance of the alkali treatment allows the adhesion properties between the antistatic hard coat layer and the low refractive index layer to be improved, and allows the excoriation resistance of the anti-reflection film to be further improved.

A method for forming the low refractive index layer provided for the anti-reflection film of the present invention is described. The low refractive index layer of the present invention may be formed by a wet film-forming method such that a coating liquid for forming the low refractive index layer containing low refractive index particles and the binder matrix forming material is applied onto the hard coat layer to form a coating film, which is cured. Then, examples of an application method include an application method by using a roll coater, a reverse-roll coater, a gravure coater, a microgravure coater, a knife coater, a bar coater, a wire bar coater, a die coater and a dip coater.

Examples of the low refractive index particle include a low refractive index particle composed of a low refractive index material such as LiF, MgF, 3NaF·AlF or AlF (all of them have a refractive index of 1.4), or $Na_3AlF_6$ (cryolite, a refractive index of 1.33). Further, a particle having a void inside the particle maybe appropriately used. With regard to the particle having a void inside the particle, a portion of the void may be regarded as a refractive index of air ($\approx 1$) to thereby allow the low refractive index particle with a very low refractive index. Specifically, a low refractive index silica particle having a void inside may be used.

The low refractive index particle added to the coating liquid for forming the low refractive index layer of the present invention is preferably 1 nm or more and 100 nm or less in particle diameter. In the case where the particle diameter is more than 100 nm, light is reflected so remarkably by Rayleigh scattering that the low refractive index layer whitens to bring a tendency to deteriorate the transparency of the anti-reflection film. On the other hand, in the case where the particle diameter is less than 1 nm, the particles cohere to cause a problem that the dispersion state of the particles in the low refractive index layer becomes nonuniform.

A hydrolysate of silicon alkoxide may be used as the binder matrix forming material added to the coating liquid for forming the low refractive index layer. The hydrolysate of silicon alkoxide represented by the general formula (1) $RxSi(OR)_{4-x}$, (in the formula, R represents an alkyl group and x is an integer of $0 \leq x \leq 3$) may be preferably used.

Examples of the silicon alkoxide represented by the general formula (1) include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane and hexyltrimethoxysilane. The hydrolysate of the silicon alkoxide may be obtained by using a metal alkoxide represented by the general formula (1) as a raw material, for example, by hydrolyzing with hydrochloric acid.

In addition, the hydrolysate of the silicon alkoxide represented by the general formula (2) $R'zSi(OR)_{4-z}$ (in the formula, R' represents a nonreactive functional group having an alkyl group, a fluoroalkyl group and a fluoroalkylene oxide group, and z is an integer of $1 \leq z \leq 3$) may be further contained as the binder matrix forming material used for forming the low refractive index layer in the silicon alkoxide represented by the general formula (1). Thus, antifouling property may be provided on the low refractive index layer surface of the anti-reflection film and the refractive index of the low refractive index layer may be further decreased.

Examples of the silicon alkoxide represented by the general formula (2) include octadecyltrimethoxysilane and 1H,1H,2H,2H-perfluorooctyltrimethoxysilane.

Further, the ionizing radiation-curable material may be used for the binder matrix forming material. The ionizing radiation-curable material described in the coating liquid for forming the hard coat layer may be used as the ionizing radiation-curable material. Further, the low refractive index particle does not necessarily need to be added for forming the low refractive index layer by using the fluorine-based ionizing radiation-curable material with a low refractive index. Further, even in the case where the ionizing radiation-curable material is used as the binder matrix forming material, a material for developing antifouling property is preferably added to the low refractive index layer surface.

In the case where the ionizing radiation-curable material is used as the binder matrix forming material to form the low refractive index layer by irradiating with ultraviolet rays, a photopolymerization initiator is added to the coating liquid for forming the low refractive index layer. Examples of the photopolymerization initiator include acetophenones, benzoins, benzophenones, phosphine oxides, ketals, anthraquinones and thioxanthones.

In the case where the hydrolysate of the silicon alkoxide is used as the binder matrix forming material, the low refractive index layer may be formed in such a manner that a coating liquid containing the hydrolysate of the silicon alkoxide and the low refractive index particle is applied onto the transparent substrate with the hard coat layer formed to form a coating film, which is dried and heated to perform a dehydration condensation reaction of the silicon alkoxide. Further, in the case where the ionizing radiation-curable material is used as the binder matrix forming material, the low refractive index layer may be formed in such a manner that a coating liquid containing the ionizing radiation-curable material and the low refractive index particle is applied onto the transparent substrate with the hard coat layer formed to form a coating film, which is dried as required to thereafter perform a curing reaction of the ionizing radiation-curable material by irradiating with an ionizing radiation such as ultraviolet rays and electron rays.

A solvent and various addition agents maybe added to the coating liquid for forming the low refractive index layer as required. The solvent is properly selected in consideration of coating aptitude from among aromatic hydrocarbons such as toluene, xylene, cyclohexane and cyclohexylbenzene, hydrocarbons such as n-hexane, ethers such as dibutyl ether, dimethoxymethane, dimethoxyethane, diethoxyethane, propylene oxide, dioxane, dioxolane, trioxane, tetrahydrofuran, anisole and phenetole, ketones such as methyl isobutyl ketone, methyl butyl ketone, acetone, methyl ethyl ketone, diethyl ketone, dipropyl ketone, diisobutyl ketone, cyclopentanone, cyclohexanone, methylcyclohexanone and methylcyclohexanone, esters such as ethyl formate, propyl formate, n-pentyl formate, methyl acetate, ethyl acetate, methyl propionate, ethyl propionate, n-pentyl acetate and γ-butyrolactone, cellosolves such as methyl cellosolve, cellosolve, butyl cellosolve and cellosolve acetate, alcohols such as methanol, ethanol and isopropyl alcohol, and water. Further, an antifoulant, a surface adjustor, a leveling agent, a refractive index adjustor, an adhesion improver and a photosensitizer as the addition agents may be added to the coating liquid.

The low refractive index layer may be also formed by subjecting the low refractive index material such as silicon oxide to vacuum processes such as a vacuum deposition method and a sputtering method. Further, in the present invention, the anti-reflection performance may be also improved by providing the high refractive index layer in addition to the low refractive index layer. However, either means brings high cost in current techniques.

In the case of having no high refractive index layers, the low refractive index layer in the anti-reflection film of the present invention is provided so that the optical film thickness (nd) of the low refractive index layer obtained by multiplying the refractive index (n) of the low refractive index layer and the layer thickness (d) thereof together is ¼ of a visible light wavelength. Then, the optical film thickness of the low refractive index layer is preferably within a range of 115 nm or more and 135 nm or less. The reflection hue may be decreased in such a manner that the optical film thickness of the low refractive index layer is determined within a range of 115 nm or more and 135 nm or less to design the optical film thickness of the low refractive index layer so as to be in the vicinity of λ/4 in determining λ=500 nm. Further, the low refractive index layer is formed by a wet application method to thereby bring some fluctuations in film thickness, and the adjustment of the optical film thickness to this range allows the anti-reflection film such that color shading due to film thickness fluctuation of the low refractive index layer is less caused.

Through the above, the low refractive index layer is formed.

Through the above, the anti-reflection film of the present invention is formed. A functional layer having antifouling performance, electromagnetic wave shielding performance, infrared absorbing performance, ultraviolet absorbing performance and color correction performance in addition to the hard coat layer and the low refractive index layer is provided for the anti-reflection film of the present invention as required. Examples of these functional layers include an antifouling layer, an electromagnetic wave shielding layer, an infrared absorbing layer, an ultraviolet absorbing layer and a color correction layer. These functional layers may be of a monolayer or plural layers. The functional layer may have plural performances in one layer. Further, these functional layers may be provided between each of the layers or on the anti-reflection film surface. Further, in the present invention, a primer layer and an adhesive layer may be provided between each of the layers for improving adhesive property between the layers of each kind.

With regard to the anti-reflection film of the present invention, the polarizing layer and the second transparent substrate are provided for a face on the transparent substrate side with the low refractive index layer not formed (the other face) to thereby allow the polarizing plate. Examples of the polarizing layer include oriented polyvinyl alcohol (PVA), to which iodine is added. Further, a substrate to be used as the transparent substrate for the anti-reflection film of the present invention may be selected as the second transparent substrate, and the film made of triacetyl cellulose may be appropriately used.

Further, the polarizing plate using the anti-reflection film of the present invention as part of components allows excellent antistatic function, antireflective function and favorable contrast in a bright place and a dark place to the transmission liquid crystal display by reason of composing part of the transmission liquid crystal display. Then, the polarizing plate is disposed in order of the polarizing plate, the liquid crystal cell, the second polarizing plate and the backlight unit from an observer side. That is to say, the polarizing plate is provided so that the low refractive index layer is on the forefront surface for the observer side.

EXAMPLE

Example 1

<Transparent Substrate>
A triacetyl cellulose film with a thickness of 80 μm was prepared as a transparent substrate.
<Polarizing Plate>
Oriented polyvinyl alcohol to which iodine was added was regarded as a polarizing layer to prepare a polarizing plate such that this polarizing layer was held between two triacetyl cellulose films with a thickness of 80 μm (first and second transparent substrates).
<Formation of Hard Coat Layer>
6.7 parts by weight of gallium-doped zinc oxide particle dispersion (GZO/an average particle diameter of 30 nm/a solid content ratio of 30% by weight) was prepared as conductive particles of an electron conduction type, 9.6 parts by weight of dipentaerythritol hexaacrylate (DPHA), 9.6 parts by weight of pentaerythritol tetraacrylate (PETA) and 28.8 parts by weight of urethane acrylate UA-306T (manufactured by Kyoei Kagaku Kogyo Co., Ltd.) was prepared as an ionizing radiation-curable material, 2.5 parts by weight of Irgacure 184 (manufactured by Chiba Japan) was prepared as a photopolymerization initiator, 45.3 parts by weight of a mixed solvent of methyl ethyl ketone and butyl acetate at a weight ratio of 1:1 was prepared as a solvent, and these were mixed to prepare a coating liquid for forming a hard coat layer.

The obtained coating liquid was applied onto one surface (the first transparent substrate) of each of the transparent substrate and the polarizing plate by a wire bar coater to form a coating film. Thereafter, the coating film was dried with an oven at a temperature of 80° C. for one minute to form a hard coat layer with a thickness of 5 μm on each of the transparent substrate and the polarizing plate by irradiating with ultraviolet rays for 10 seconds from a distance of 20 cm at an output of 120 W with the use of a metal halide lamp after drying.
<Formation of Low Refractive Index Layer>
12 parts by weight of low refractive index silica particulate dispersion (an average particle diameter of 30 nm/a solid content of 20% by weight) and 1.6 parts by weight of dipentaerythritol hexaacrylate (DPHA) as an ionizing radiation-curable material were prepared, 0.2 part by weight of TSF44 (manufactured by Toshiba GE Silicone) was prepared as a silicone-based addition agent, 0.2 part by weight of Irgacure 184 (manufactured by Chiba Japan) was prepared as a photopolymerization initiator, 86.4 parts by weight of methyl isobutyl ketone was prepared as a solvent, and these were mixed to prepare a coating liquid for forming a low refractive index layer.

The obtained coating liquid was applied onto the hard coat layer formed on each of the transparent substrate and the polarizing plate by a wire bar coater to form a coating film. Thereafter, the coating film was dried with an oven to form a low refractive index layer on the hard coat layer by curing at an exposure amount of 500 mJ/cm$^2$ with the use of a conveyor-type ultraviolet curing device after drying. The film thickness of either of the obtained low refractive index layers was 91 nm, the refractive index thereof was 1.37 and the optical film thickness thereof was 125 nm.

Through the above, an anti-reflection film provided sequentially with the transparent substrate, the hard coat layer and the low refractive index layer, and the polarizing plate provided sequentially with the second transparent substrate, the polarizing layer, the first transparent substrate, the hard coat layer and the low refractive index layer were produced.

Example 2

<Transparent Substrate>
A triacetyl cellulose film with a thickness of 80 μm was prepared as a transparent substrate in the same manner as (Example 1).
<Polarizing Plate>
Oriented polyvinyl alcohol to which iodine was added was regarded as a polarizing layer in the same manner as (Example 1) to prepare a polarizing plate such that this polarizing layer was held between two triacetyl cellulose films with a thickness of 80 μm (first and second transparent substrates).
<Formation of Hard Coat Layer>
41.7 parts by weight of gallium-doped zinc oxide particle dispersion (GZO/an average particle diameter of 15 nm/a solid content ratio of 30% by weight) was prepared as conductive particles of an electron conduction type, 7.5 parts by weight of dipentaerythritol hexaacrylate (DPHA), 7.5 parts by weight of pentaerythritol tetraacrylate (PETA) and 22.5 parts by weight of urethane acrylate UA-306T (manufactured by Kyoei Kagaku Kogyo Co., Ltd.) was prepared as an ionizing radiation-curable material, 2.5 parts by weight of Irgacure 184 (manufactured by Chiba Japan) was prepared as a photopolymerization initiator, 20.8 parts by weight of a mixed solvent of methyl ethyl ketone and butyl acetate at a weight ratio thereof 1:1 was prepared as a solvent, and these were mixed to prepare a coating liquid for forming a hard coat layer.

The obtained coating liquid was applied onto one surface (the first transparent substrate) of each of the transparent substrate and the polarizing plate by a wire bar coater to form a coating film. Thereafter, the coating film was dried with an oven at a temperature of 80° C. for one minute to form a hard coat layer with a thickness of 5 μm on the transparent substrate and the polarizing plate by irradiating with ultraviolet rays for 10 seconds from a distance of 20 cm at an output of 120 W with the use of a metal halide lamp after drying.
<Formation of Low Refractive Index Layer>

A low refractive index layer was formed on the hard coat layer formed on each of the transparent substrate and the polarizing plate in the same manner as (Example 1). The film thickness of either of the obtained low refractive index layers was 91 nm, the refractive index thereof was 1.37 and the optical film thickness thereof was 125 nm.

Through the above, an anti-reflection film provided sequentially with the transparent substrate, the hard coat layer and the low refractive index layer, and the polarizing plate provided sequentially with the second transparent substrate, the polarizing layer, the first transparent substrate, the hard coat layer and the low refractive index layer were produced.

Example 3

<Transparent Substrate>
A triacetyl cellulose film with a thickness of 80 μm was prepared as a transparent substrate in the same manner as (Example 1).
<Polarizing Plate>
Oriented polyvinyl alcohol to which iodine was added was regarded as a polarizing layer in the same manner as (Example 1) to prepare a polarizing plate such that this polarizing layer was held between two triacetyl cellulose films with a thickness of 80 μm (first and second transparent substrates).
<Formation of Hard Coat Layer>

16.7 parts by weight of Baytron P CH 8000 (manufactured by H.C.Starck/dispersion/a solid content of 3% by weight) was prepared as a conductive polymer of an electron conduction type, 6.7 parts by weight of gallium-doped zinc oxide particle dispersion (GZO/an average particle diameter of 15 nm/a solid content ratio of 30% by weight) was prepared as conductive particles of an electron conduction type, 9.6 parts by weight of dipentaerythritol hexaacrylate (DPHA), 9.6 parts by weight of pentaerythritol tetraacrylate (PETA) and 28.8 parts by weight of urethane acrylate UA-306T (manufactured by Kyoei Kagaku Kogyo Co., Ltd.) was prepared as an ionizing radiation-curable material, 2.5 parts by weight of Irgacure 184 (manufactured by Chiba Japan) was prepared as a photopolymerization initiator, 28.6 parts by weight of a mixed solvent of methyl ethyl ketone and butyl acetate at a weight ratio thereof 1:1 was prepared as a solvent, and these were mixed to prepare a coating liquid for forming a hard coat layer.

The obtained coating liquid was applied onto one surface (the first transparent substrate) of each of the transparent substrate and the polarizing plate by a wire bar coater to form a coating film. Thereafter, the coating film was dried with an oven at a temperature of 80° C. for one minute to form a hard coat layer with a thickness of 5 μm on each of the transparent substrate and the polarizing plate by irradiating with ultraviolet rays for 10 seconds from a distance of 20 cm at an output of 120 W with the use of a metal halide lamp after drying.
<Formation of Low Refractive Index Layer>

A low refractive index layer was formed on the hard coat layer formed on each of the transparent substrate and the polarizing plate in the same manner as (Example 1). The film thickness of either of the obtained low refractive index layers was 91 nm, the refractive index thereof was 1.37 and the optical film thickness thereof was 125 nm.

Through the above, an anti-reflection film provided sequentially with the transparent substrate, the hard coat layer and the low refractive index layer, and the polarizing plate provided sequentially with the second transparent substrate, the polarizing layer, the first transparent substrate, the hard coat layer and the low refractive index layer were produced.

Comparative Example 1

<Polarizing Plate>
Oriented polyvinyl alcohol to which iodine was added was regarded as a polarizing layer in the same manner as (Example 1) to prepare a polarizing plate such that this polarizing layer was held between two triacetyl cellulose films with a thickness of 80 μm (first and second transparent substrates).
<Formation of Hard Coat Layer>

10.0 parts by weight of dipentaerythritol hexaacrylate (DPHA), 10.0 parts by weight of pentaerythritol tetraacrylate (PETA) and 30.0 parts by weight of urethane acrylate UA-306T (manufactured by Kyoei Kagaku Kogyo Co., Ltd.) was prepared as an ionizing radiation-curable material, 2.5 parts by weight of Irgacure 184 (manufactured by Chiba Japan) was prepared as a photopolymerization initiator, 50.0 parts by weight of a mixed solvent of methyl ethyl ketone and butyl acetate at a weight ratio thereof 1:1 was prepared as a solvent, and these were mixed to prepare a coating liquid for forming a hard coat layer.

The obtained coating liquid was applied onto one surface (the first transparent substrate) of the polarizing plate by a wire bar coater to form a coating film. Thereafter, the coating film was dried with an oven at a temperature of 80° C. for one minute to form a hard coat layer with a thickness of 5 μm on the polarizing plate by irradiating with ultraviolet rays for 10 seconds from a distance of 20 cm at an output of 120 W with the use of a metal halide lamp after drying.

Through the above, the polarizing plate provided sequentially with the second transparent substrate, the polarizing layer, the first transparent substrate and the hard coat layer was produced.

Comparative Example 2

<Transparent Substrate>
A triacetyl cellulose film with a thickness of 80 μm was prepared as a transparent substrate in the same manner as (Example 1).
<Polarizing Plate>
Oriented polyvinyl alcohol to which iodine was added was regarded as a polarizing layer in the same manner as (Example 1) to prepare a polarizing plate such that this polarizing layer was held between two triacetyl cellulose films with a thickness of 80 μm (first and second transparent substrates).
<Formation of Hard Coat Layer>

10.0 parts by weight of dipentaerythritol hexaacrylate (DPHA), 10.0 parts by weight of pentaerythritol tetraacrylate (PETA) and 30.0 parts by weight of urethane acrylate UA-306T (manufactured by Kyoei Kagaku Kogyo Co., Ltd.) was prepared as an ionizing radiation-curable material, 2.5 parts by weight of Irgacure 184 (manufactured by Chiba Japan) was prepared as a photopolymerization initiator, 50.0 parts by weight of a mixed solvent of methyl ethyl ketone and butyl acetate at a weight ratio thereof 1:1 was prepared as a solvent, and these were mixed to prepare a coating liquid for forming a hard coat layer.

The obtained coating liquid was applied onto one surface (the first transparent substrate) of each of the transparent substrate and the polarizing plate by a wire bar coater to form a coating film. Thereafter, the coating film was dried with an oven at a temperature of 80° C. for one minute to form a hard coat layer with a thickness of 5 μm on each of the transparent substrate and the polarizing plate by irradiating with ultraviolet rays for 10 seconds from a distance of 20 cm at an output of 120 W with the use of a metal halide lamp after drying.
<Formation of Low Refractive Index Layer>

A low refractive index layer was formed on the hard coat layer formed on each of the transparent substrate and the polarizing plate in the same manner as (Example 1). The film thickness of either of the obtained low refractive index layers was 91 nm, the refractive index thereof was 1.37 and the optical film thickness thereof was 125 nm.

Through the above, an anti-reflection film provided sequentially with the transparent substrate, the hard coat layer and the low refractive index layer, and the polarizing plate provided sequentially with the second transparent substrate, the polarizing layer, the first transparent substrate, the hard coat layer and the low refractive index layer were produced.

Comparative Example 3

<Transparent Substrate>

A triacetyl cellulose film with a thickness of 80 μm was prepared as a transparent substrate in the same manner as (Example 1).
<Polarizing Plate>

Oriented polyvinyl alcohol to which iodine was added was regarded as a polarizing layer in the same manner as (Example 1) to prepare a polarizing plate such that this polarizing layer was held between two triacetyl cellulose films with a thickness of 80 μm (first and second transparent substrates).
<Formation of Hard Coat Layer>

41.7 parts by weight of antimony-doped tin oxide particle dispersion (ATO/an average particle diameter of 60 nm/a solid content ratio of 30% by weight) was prepared as conductive particles of an electron conduction type, 7.5 parts by weight of dipentaerythritol hexaacrylate (DPHA), 7.5 parts by weight of pentaerythritol tetraacrylate (PETA) and 22.5 parts by weight of urethane acrylate UA-306T (manufactured by Kyoei Kagaku Kogyo Co., Ltd.) was prepared as an ionizing radiation-curable material, 2.5 parts by weight of Irgacure 184 (manufactured by Chiba Japan) was prepared as a photopolymerization initiator, 20.8 parts by weight of a mixed solvent of methyl ethyl ketone and butyl acetate at a weight ratio thereof 1:1 was prepared as a solvent, and these were mixed to prepare a coating liquid for forming a hard coat layer.

The obtained coating liquid was applied onto one surface (the first transparent substrate) of each of the transparent substrate and the polarizing plate by a wire bar coater to form a coating film. Thereafter, the coating film was dried with an oven at a temperature of 80° C. for one minute to form a hard coat layer with a thickness of 5 μm on each of the transparent substrate and the polarizing plate by irradiating with ultraviolet rays for 10 seconds from a distance of 20 cm at an output of 120 W with the use of a metal halide lamp after drying.
<Formation of Low Refractive Index Layer>

A low refractive index layer was formed on the hard coat layer formed on each of the transparent substrate and the polarizing plate in the same manner as (Example 1). The film thickness of either of the obtained low refractive index layers was 91 nm, the refractive index thereof was 1.37 and the optical film thickness thereof was 125 nm.

Through the above, an anti-reflection film provided sequentially with the transparent substrate, the antistatic hard coat layer and the low refractive index layer, and the polarizing plate provided sequentially with the second transparent substrate, the polarizing layer, the first transparent substrate, the hard coat layer and the low refractive index layer were produced.

The following measurement was performed for the anti-reflection film obtained in (Example 1) to (Example 3), (Comparative Example 2) and (Comparative Example 3). Further, the following measurement was performed for the polarizing plate obtained in (Example 1) to (Example 3) and (Comparative Example 1) to (Comparative Example 3).
(Measurement of Various Properties of Anti-Reflection Film)

Measurement of Haze (H) and Parallel Ray Transmittance

The haze (H) and the parallel ray transmittance were measured for the obtained anti-reflection film by using a mapping measuring instrument (NDH-2000, manufactured by NIPPON DENSHOKU INDUSTRIES CO., LTD.).

Measurement of Visibility-Average Light Transmittance Absorption Loss and Light Transmittance Absorption Loss at Each Wavelength The spectral reflectance and the spectral transmittance in the direct transmission direction and the regular reflection direction were measured for the obtained anti-reflection film under the conditions of 2°-visual field in such a manner that an automatic spectrophotometer (U-4000, manufactured by Hitachi, Ltd.) was used, C light source was used as a light source and incident and emergent angles of the light source and a photoreceptor were set at 5° from the vertical direction against the anti-reflection film surface, and then the visibility-average light transmittance absorption loss (Q), the difference between the maximum value and the minimum value of the light transmittance absorption loss in the visible light region and the light transmittance absorption loss at each wavelength ($Q_{450}$: light transmittance absorption loss at a wavelength of 450 nm/$Q_{550}$: light transmittance absorption loss at a wavelength of 550 nm/$Q_{650}$: light transmittance absorption loss at a wavelength of 650 nm) were calculated.

Then, the light transmittance absorption loss at each wavelength ($Q_{450}$, $Q_{550}$ and $Q_{650}$) was calculated by the Expression (1). The visibility-average light transmittance absorption loss (Q) was obtained in such a manner that the light transmittance absorption loss at each wavelength obtained by the Expression (1) was corrected and thereafter averaged with relative visibility. Further, bright-light vision standard relative visibility was used for the relative visibility.

$$Q\lambda = 100 - H - T\lambda - R\lambda \qquad \text{(Expression 1)}$$

$Q\lambda$: light transmittance absorption loss (%)
H: haze (%)
$T\lambda$: spectral transmittance (%)
$R\lambda$: both-side reflectance (%)

Measurement of Visibility-Average Reflectance and Reflection Hue

The opposite surface to the low refractive index layer forming surface of the obtained anti-reflection film was blackly coated with a black matte spray. After coated, the spectral reflectance in the regular reflection direction was measured under the conditions of 2°-visual field in such a manner that an automatic spectrophotometer (U-4000, manufactured by Hitachi, Ltd.) was used, C light source was used as a light source and incident and emergent angles of the light source and a photoreceptor were set at 5° from the vertical direction against the anti-reflection film surface, and then the visibility-average reflectance and the reflection hue (a*, b*) were calculated.

Measurement of Surface Resistivity

The surface resistivity of the anti-reflection film was measured by a high resistivity meter (Hiresta MCP-HT260, manufactured by Dia Instruments) in conformity to JIS K6911.

(Measurement of Various Properties of Polarizing Plate)

Measurement of Parallel Visibility-Average Transmittance, Parallel Hue, Orthogonal Visibility-Average Transmittance and Orthogonal Hue The polarizing plate obtained in (Example 1) to (Example 3) and (Comparative Example 1) to (Comparative Example 3), and a polarizing plate (a second polarizing plate) not provided with the same hard coat layer and anti-reflection layer as were first prepared in Example 1 and the like were disposed through an adhesive layer so that a polarization axis became parallel, the spectral transmittance in the direct transmission direction was measured under the conditions of 2°-visual field in such a manner that an automatic spectrophotometer (U-4000, manufactured by Hitachi, Ltd.) was used, C light source was used as a light source and incident and emergent angles of the light source and a photoreceptor were set in the vertical direction against the anti-reflection film surface, and then the parallel visibility-average transmittance and the parallel hue (a*, b*) were calculated.

Further, the polarizing plate obtained in (Example 1) to (Example 3) and (Comparative Example 1) to (Comparative Example 3), and a polarizing plate (a second polarizing plate) not provided with the hard coat layer and the anti-reflection layer were disposed through an adhesive layer so that a polarization axis became orthogonal, the spectral transmittance in the direct transmission direction was measured under the conditions of 2°-visual field in such a manner that an automatic spectrophotometer (U-4000, manufactured by Hitachi, Ltd.) was used, C light source was used as a light source and incident and emergent angles of the light source and a photoreceptor were set in the vertical direction against the anti-reflection film surface, and then the orthogonal visibility-average transmittance and the orthogonal hue (a*, b*) were calculated.

The results of various properties are shown in Table 1.

TABLE 1

| | Anti-reflection film | | | | | | | |
|---|---|---|---|---|---|---|---|---|
| | Visibility-average reflectance | Haze | Parallel ray transmittance | Visibility-average light transmittance absorption loss Q | Difference between maximum value and minimum value of light transmittance absorption loss | Light transmittance absorption loss $Q_\lambda$ at each wavelength $\lambda$ (450 nm, 550 nm and 650 nm) | | |
| | | | | | | $Q_{450}$ | $Q_{550}$ | $Q_{650}$ |
| Example 1 | 1.1% | 0.1% | 95.3% | 0.9% | 0.8% | 0.7% | 0.9% | 1.3% |
| Example 2 | 1.1% | 0.2% | 94.9% | 1.3% | 0.6% | 1.0% | 1.3% | 1.5% |
| Example 3 | 1.1% | 0.2% | 94.3% | 2.2% | 1.8% | 1.5% | 2.3% | 2.8% |
| Comparative Example 1 | — | — | — | — | — | — | — | — |
| Comparative Example 2 | 1.1% | 0.1% | 96.1% | <0.1% | <0.1% | <0.1% | <0.1% | <0.1% |
| Comparative Example 3 | 1.1% | 0.6% | 85.2% | 6.4% | 4.1% | 4.8% | 6.6% | 7.5% |

| | Polarizing plate | | | | | | |
|---|---|---|---|---|---|---|---|
| | Reflection hue | | Surface resistivity ($\Omega/cm^2$) | Parallel visibility-average transmittance | Parallel hue | | Orthogonal visibility-average transmittance |
| | a* | b* | | | a* | b* | |
| Example 1 | 2.7 | −1.8 | $2.0 \times 10^8$ | 40.0% | −2.4 | 5.8 | 0.06% |
| Example 2 | 2.8 | −2.1 | $7.0 \times 10^9$ | 39.8% | −1.9 | 2.8 | 0.05% |
| Example 3 | 2.7 | −1.9 | $1.0 \times 10^8$ | 39.2% | −1.8 | 2.4 | 0.03% |
| Comparative Example 1 | — | — | — | 38.2% | −2.9 | 7.2 | 0.04% |
| Comparative Example 2 | 2.7 | −1.8 | $<1.0 \times 10^{13}$ | 40.2% | −3.1 | 8.1 | 0.08% |
| Comparative Example 3 | 2.6 | −0.8 | $2.0 \times 10^{10}$ | 35.1% | −2.4 | 6.2 | 0.02% |

*<0.1%: less than 0.1%
*>$1.0 \times 10^{13}$: more than $1.0 \times 10^{13}$

Through the results of the polarizing plate of (Example 1) to (Example 3), it was confirmed that the anti-reflection film of the present invention was the anti-reflection film which allowed more appropriate black indication by reason of selectively restraining the problem that light leakage, observed when a pair of the polarizing plates provided with oriented polyvinyl alcohol containing iodine as the polarizing layer were disposed and subjected to the black indication so that the polarization axis thereof became orthogonal, was tinged with blue, that is, the problem that the screen of the transmission liquid crystal display was tinged with blue on the occasion of black indication.

(Evaluation of Contrast)

Further, the anti-reflection film obtained in (Example 1) to (Example 3), (Comparative Example 2) and (Comparative Example 3) was stuck to the transmission liquid crystal display (FTD-W2023ADSR manufactured by BUFFALO INC.) surface through an adhesive layer so that the anti-reflection layer was on the forefront surface.

The stuck transmission liquid crystal display was subjected to the black indication and the white indication under the conditions of a bright place (200 lux) and a dark place (0 lux) by switching indoor illumination to evaluate contrast by measuring luminance.

With regard to the transmission liquid crystal display to which the anti-reflection film of (Example 1) to (Example 3) was stuck, it was confirmed that the contrast in a dark place improved for the reason that the luminance on the occasion of the black indication in a dark place (black luminance) deteriorated as compared with the transmission liquid crystal display to which the anti-reflection film of (Comparative Example 2) was stuck.

On the other hand, with regard to the transmission liquid crystal display to which the anti-reflection film of (Comparative Example 3) was stuck, it was confirmed that both the contrast in a bright place and the contrast in a dark place deteriorated for the reason that the black luminance in a dark place deteriorated while the luminance on the occasion of the white indication in a dark place and a bright place (white luminance) also deteriorated, as compared with the transmission liquid crystal display to which the anti-reflection film of (Comparative Example 2) was stuck.

What is claimed is:

1. An anti-reflection film comprising:
    a transparent substrate;
    a hard coat layer on a surface of the transparent substrate; and
    a low refractive index layer over the surface of the transparent substrate,
    wherein the hard coat layer contains gallium-doped zinc oxide particles,
    wherein a content of the particles in the hard coat layer is less than 5 wt %,
    and
    wherein a content of the particles is within a range of 0.1 g/m$^2$ or more and 0.8 g/m$^2$ or less per unit area.

2. A polarizing plate comprising the anti-reflection film according to claim 1, a polarizing layer below the anti-reflection film, and a second transparent substrate below the polarizing layer.

3. A transmission liquid crystal display comprising the polarizing plate according to claim 2, a liquid crystal cell below the polarizing plate, a second polarizing plate below the liquid crystal cell, and a backlight unit below the second polarizing plate.

* * * * *